US011808850B2

(12) United States Patent
Augenstein et al.

(10) Patent No.: US 11,808,850 B2
(45) Date of Patent: *Nov. 7, 2023

(54) 1D ULTRASONIC TRANSDUCER UNIT FOR HAZARD IDENTIFICATION FOR A VEHICLE

(71) Applicant: Pepperl + Fuchs SE, Mannheim (DE)

(72) Inventors: Regine Augenstein, Mannheim (DE); Thomas Kaindl, Dossenheim (DE)

(73) Assignee: Pepperl + Fuchs SE, Mannheim (DE)

( * ) Notice: Subject to any disclaimer, the term of this patent is extended or adjusted under 35 U.S.C. 154(b) by 4 days.

This patent is subject to a terminal disclaimer.

(21) Appl. No.: 17/167,071

(22) Filed: Feb. 3, 2021

(65) Prior Publication Data
US 2021/0156996 A1 May 27, 2021

Related U.S. Application Data

(63) Continuation of application No. PCT/EP2019/000165, filed on May 23, 2019.

(30) Foreign Application Priority Data

Aug. 3, 2018 (DE) ...................... 10 2018 006 130.3

(51) Int. Cl.
*G01S 15/931* (2020.01)
*G01S 7/521* (2006.01)
(Continued)

(52) U.S. Cl.
CPC .............. *G01S 15/931* (2013.01); *G01S 5/02* (2013.01); *G01S 7/521* (2013.01); *G01S 7/54* (2013.01)

(58) Field of Classification Search
None
See application file for complete search history.

(56) References Cited

U.S. PATENT DOCUMENTS

| 4,803,670 A | * | 2/1989 | Chen | ....................... G01S 7/521 |
| | | | | 340/904 |
| 2012/0108975 A1 | * | 5/2012 | Marteau | .............. G01S 15/8909 |
| | | | | 600/447 |

(Continued)

FOREIGN PATENT DOCUMENTS

| DE | 19809206 A1 | 9/1999 |
| EP | 0928640 A1 | 7/1999 |

(Continued)

OTHER PUBLICATIONS

IP Rating Chart, "https://web.archive.org/web/20170718220414/http://www.dsmt.com/resources/ip-rating-chart/" (Year: 2017).*

(Continued)

*Primary Examiner* — Isam A Alsomiri
*Assistant Examiner* — Vikas Atmakuri
(74) *Attorney, Agent, or Firm* — Muncy, Geissler, Olds & Lowe, P.C.

(57) ABSTRACT

A 1D ultrasonic transducer unit for detecting danger for a vehicle, comprising a housing mounted on the vehicle, which includes at least three discrete ultrasonic transducers, designed to decouple sound waves at a corresponding working frequency between 20 kHz and 400 kHz into a gaseous medium, and a control unit, designed to control each ultrasonic transducer individually, two ultrasonic transducers directly adjacent to each other in each case having a distance, the 1D ultrasonic transducer unit having one sound channel per ultrasonic transducer, each with one inlet opening assigned to exactly one ultrasonic transducer and one outlet opening (26), the outlet openings being arranged along a straight line, a distance from directly adjacent outlet openings corresponding to no more than the full or half wavelength in the gaseous medium and being shorter than the corresponding distance.

16 Claims, 3 Drawing Sheets

(51) Int. Cl.
*G01S 7/54* (2006.01)
*G01S 5/02* (2010.01)

(56) References Cited

U.S. PATENT DOCUMENTS

| | | | | |
|---|---|---|---|---|
| 2013/0283918 | A1* | 10/2013 | Habermehl | G01N 29/262 73/622 |
| 2014/0283611 | A1* | 9/2014 | Habermehl | G10K 11/346 73/602 |
| 2015/0011884 | A1* | 1/2015 | Walker | A61B 5/418 600/447 |
| 2015/0041248 | A1* | 2/2015 | Ichihashi | F02C 7/24 29/896.2 |
| 2019/0281383 | A1* | 9/2019 | Shigihara | G10K 11/025 |

FOREIGN PATENT DOCUMENTS

| | | | |
|---|---|---|---|
| EP | 0940801 A2 | 9/1999 | |
| EP | 2922050 A1 * | 9/2015 | G10K 11/22 |
| JP | H10224880 A | 8/1998 | |
| JP | 2009-264872 A | 11/2009 | |
| WO | WO2008/135004 A1 | 11/2008 | |

OTHER PUBLICATIONS

Air-Speed of sound vs Temperature, The Engineering Toolbox, (Year: 2018).*

International Search Report dated Sep. 23, 2019 in corresponding application PCT/EP2019/000165.

Jaeger, Axel et al: "Air-coupled 40-kHz ultrasonic 2D-phased array based on a 3D-printed waveguide structure" 2017 IEEE International Ultrasonics Symposium, IEEE, Sep. 6, 2017, pp. 1-4, DOI:10.1109/ULTSYM.2017.8091892, XP033245009.

Murata Manufacturing: "Ultrasonic Sensor Application Manual Cat. No. S15E-5", Internet, Jan. 1, 2009, https://cdn-reichelt.de/documents/datenblatt/B400/ULTRASCHALL%20SENSOR.pdf, XP055620003.

Konetzke, Eric et al: "Phased array transducer for emitting 40-kHz air-coupled ultrasound without grating lobes" 2015 IEEE International Ultrasonics Symposium, IEEE, Oct. 21, 2015, pp. 1-4, DOI: 10.1109/ULTSYM.2015.0019, XP032799399.

Takayuki Takahashi et al: "Ultrasonic phased array sensor for electric travel aids for visually impaired people" Proceedings of the SPIE—The International Society for Optical Engineering SPIE—Vertical-Cavity Surface-Emitting Lasers XIII, SPIE OPTO: Integrated Optoelectronic Devices, Jan. 24-29, 2009, San Jose California, United States, vol. 6794, Dec. 3, 2007, p. 67943V DOI: 10.1117/12.783988, ISSN: 0277-786X, XP055619716.

* cited by examiner

1D ULTRASONIC TRANSDUCER UNIT FOR HAZARD IDENTIFICATION FOR A VEHICLE

This nonprovisional application is a continuation of International Application No. PCT/EP2019/000165, which was filed on May 23, 2019 and which claims priority to German Patent Application No. 10 2018 006 130.3, which was filed in Germany on Aug. 3, 2018 and which are both herein incorporated by reference.

BACKGROUND OF THE INVENTION

Field of the Invention

The present invention relates to a 1D ultrasonic transducer unit, which includes at least three discrete and individually controllable ultrasonic transducers for detecting objects, contours or distances.

Description of the Background Art

Ultrasound or ultrasonic sensors are used in a wide range of measuring arrangements. Depending on the application, the ultrasound is decoupled into a liquid or gaseous medium.

An ultrasonic transducer array for use in gaseous media is known from WO 2008/135 004 A1. The array has a layer structure made up of a layer of an electret between two electrode structures, the one electrode structure comprising multiple independently addressable electrode elements, whereby local thickness oscillations of the electret layer are generated.

A 1.5D array of ultrasonic transducers having an improved near field resolution is known from US 2013/0283918 A1. Phased ultrasonic transducer arrays and adaptive or compensating control methods are described in US 2014/0283611 A1 and U.S. Pat. No. 6,310,831 B1.

Further ultrasonic transducers are known from EP 0 940 801 A2 as well as from "Phased array transducer for emitting 40 kHz air-coupled ultrasound without grating lobes," Eric Konetzke et al., IEEE International Ultrasonic Symposium, 2015, pp. 1-4, and from "Air-coupled 40-kHz ultrasonic 2D-phased array based on a 3D-printed waveguide structure," Jager et al., IEEE International Ultrasonic Symposium, 2017, pp. 1-4, and from "Takahashi et al., Ultrasonic phased array sensor for electrical travel aids for visually impaired people, Proceedings of the spie—The international Society for Optical Engineering spie—Vertical-Cavity Surface-Emitting Lasers XIII, Vol. 6794, Dec. 3, 2007, page 67943V, ISSN: 0277-786X," and from "Manufacturing Murata: Ultrasonic Sensor Application Manual Cat. No. S15E-5, Jan. 1, 2009, URL: https://cdn-reichelt.de/documents/datenblatt/8400/ultraschall %20sensor.pdf, page 3."

For use in an industrial environment, the ultrasonic transducers used must be able to guarantee a temperature stability of the measurement between −40° C. and, in some cases, more than +100° C. and an electromagnetic compatibility with other technical devices. In addition, the ultrasonic transducers must be robust against harsh environmental influences, such as dust, moisture, aggressive chemicals, as well as against mechanical impacts or against mechanical scratching.

To achieve high detection ranges, piezoelectric ceramics are used, for example lead zirconate titanate (PZT), which have high coupling factors compared to other piezoelectric materials, such as quartz, elecrets or PVFD. The coupling factor represents a measure of the conversion efficiency between mechanically and electrically stored energy. The latter are in the range, for example, of 0.3 to approximately 0.75 for PZT, depending on the excitation direction.

Depending on the polarization direction of the piezoelectric material, resonant mechanical oscillations may be generated in the piezoelectric body with the aid of AC voltages, which are referred to as planar, thickness or shear mode, depending on the geometric propagation. For these types of oscillations, typical dimensions of the piezoelectric body, which are necessary for a resonant oscillation at a predefined frequency, may be estimated from the material-specific frequency constant. These frequency constants are typically between 1,300 kHz*mm to 2,600 kHz*mm for PZT, depending on the oscillation type.

A thin wafer made from PZT suitable for sensors therefore has a diameter of approximately 4 mm to 100 mm for excitation frequencies from 20 kHz to 500 kHz in planar mode. Due to the capacitive properties of a thin wafer of this type, low excitation voltages may be effectively converted with a corresponding polarization.

Greater thicknesses of the piezoelectric wafer are not desirable. On the one hand, as the thickness of the piezoelectric material increases, higher voltages must be quickly provided, including in the kV range, for the same frequency range, which means increased safety precautions. On the other hand, the stiffness of the piezoelectric body changes along with its thickness, which has direct effects on the reception case of sound waves.

If multiple ultrasonic transducers are used in an at least one-dimensional phased array, it may furthermore be observed that the distances between adjacent ultrasonic transducers should not be greater than the wavelength of the ultrasound wave or preferable not greater than half the wavelength. Due to this spacing condition, the size of the individual transducers or the frequency ranges possible with a certain design/size of the ultrasonic transducers is/are correspondingly limited.

For a frequency range between 20 kHz and 500 kHz and a decoupling in air, a maximum distance between adjacent transducers is, for example, in the magnitude of approximately 8.5 mm to approximately 0.3 mm.

However, the transducer described above, which has a thin wafer made from PZT suitable for sensors has a diameter which is on average more than 10 times larger, due to the piezoelectric wafer diameter.

SUMMARY OF THE INVENTION

It is therefore an object of the present invention to provide a device which refines the prior art.

The object is achieved by a 1D ultrasonic transducer unit for detecting danger for a vehicle.

According to an exemplary embodiment of the invention, a 1D ultrasonic transducer unit for detecting danger for a vehicle is provided. The 1D ultrasonic transducer unit comprises a housing, at least three ultrasonic transducers and a control unit, the control unit being designed to control each ultrasonic transducer individually, the housing being mounted on the vehicle, each ultrasonic transducer including one transducer housing, a piezoelectric body arranged in the transducer housing, and a sound decoupling layer arranged on an open end of the transducer housing for decoupling into a gaseous medium, and being arranged in a fixed position in the housing.

Each ultrasonic transducer is designed to emit and/or to receive a sound wave at a corresponding working frequency, the working frequency of the sound waves being in a range from 20 kHz to 400 kHz. Two ultrasonic transducers directly adjacent to each other in each case in the housing have a distance of no more than 10 cm or no more than 5 cm or no more than 2 cm from the middle of the sound decoupling layer to the middle of the other sound decoupling layer.

The 1D ultrasonic transducer unit has one sound channel per ultrasonic transducer, each sound channel having an inlet opening and an outlet opening, each sound decoupling layer being assigned to exactly one of the inlet openings, and the outlet openings being arranged along a straight line. The outlet openings are each arranged in a wall of the housing not abutting the vehicle, or the sound channels penetrate the wall of the housing, a distance from the middle of one of the outlet openings to the middle of a directly adjacent outlet opening corresponding to no more than the wavelength in the gaseous medium or no more than half the wavelength in the gaseous medium, and the distance between two directly adjacent outlet openings being shorter in each case than the distance of the ultrasonic transducers assigned to the corresponding inlet openings. A ratio of the surface area of the outlet opening to a surface area of the inlet opening has a value between 0.30 and 1.2, and each sound channel has at least a length corresponding to the diameter of the inlet opening.

It is understood that the ultrasonic transducers of the 1D ultrasonic transducer unit are individual, discrete components, each ultrasonic transducer being arranged in the housing and being connected to the housing and thus being spaced a fixed distance apart from all further ultrasonic transducers. Two ultrasonic transducers arranged side by side, between which no further ultrasonic transducer is arranged, are situated directly adjacent to each other.

It is also understood that the individual sound channels are provided with a tubular or rod-shaped design, the tube diameter, for example, being designed to be reduced and/or the shape of the cross-sectional surface to be changed and/or the course of the channel to be bow-shaped. The sound channels advantageously have no edges over their entire length from the sound decoupling layer to their outlet opening.

The sound channels conduct the sound waves generated by the individual ultrasonic transducers out of the housing, or they reflect sound waves back to the ultrasonic transducers. A wave front is thus created at the outlet openings at the housing wall or outside the housing by superimposition.

With the aid of the multiple individually controllable ultrasonic transducers, wave fronts having a settable main propagation direction may be generated by time-shifted or phase-shifted control. By arranging sound channels in front of the individual ultrasonic transducers, the individual sound sources are relocated to the particular ends or the outlet openings of the sound channels during the superimposition or for the superimposition to form a common wave front. This makes it possible to set the distances between the individual sound sources independently of the size, e.g. the diameter, of the individual ultrasonic transducers or independently of the distances between the individual ultrasonic transducers. In particular, it is possible to reduce the distances between the sound sources compared to the distances between the individual transducers.

With a housing diameter of the individual ultrasonic transducers of, for example, 7 mm, the distance between two transducers is, however, at least 14 mm. Without an sound channel, therefore, only wave fronts having frequencies of up to no more than 22 kHz (a. 14 mm) or up to no more than 11 kHz ($\lambda/2 \geq 14$ mm) may therefore be implemented. The generation of wave fronts having higher frequencies, i.e. shorter wavelengths, is possible using the same ultrasonic transducers only with the aid of the sound channels according to the invention, since the distance of the individual "sound sources" during the superimposition is not determined by the size of the transducer housing but only by the size and the distance of the sound channel outlet openings.

In addition, a precise, directed detection is ensured by the sound channels.

The emitting aperture of the piezoelectric transducer, e.g. a circular aperture having a diameter predefined by the piezoelectric body, is changed with the aid of the sound channels in such a way that they meet the conditions of a desired array arrangement in at least one dimension. This permits the use of robust, reliable and/or cost-effective discrete ultrasonic transducers in a phased-array arrangement, which, in turn, permits a large view angle and thus a reliable monitoring of danger areas of vehicles. It is not necessary to use particularly small, for example integrated, ultrasonic transducers, such as MEMS. It is likewise not necessary to mount, read out and possibly coordinate multiple sensor units.

The housing can include a movable cover device, the cover device being designed to close the outlet openings of all sound channels. The sound channels may be closed with the aid of the cover device as long as the 1D ultrasonic transducer unit is not being used, whereby the penetration of dirt may be prevented. The 1D ultrasonic transducer unit comprises, for example, an actuator for opening and closing the sound channels or for moving the cover device. The actuator is alternatively a part of the vehicle. For example, the sound channels are closed as standard with the aid of the cover device, the cover device being removed once the vehicle is reversing or the reverse gear is engaged.

The ratio between the surface area of the second cross-sectional surface and the surface area of the first cross-sectional surface can have a value between 0.5 and 1.5 or between 0.9 and 1.1. The surface area of the inlet surface may be enlarged, reduced or remain the same according to the invention, a reduction of at least the width of the outlet opening, compared to the inlet opening, being achieved simultaneously.

Each sound channel can have a length from the sound decoupling layer of each ultrasonic transducer to the outlet opening of the assigned sound channel, the length being an integral multiple of one eighth of the wavelength of the sound frequency or an integral multiple of half the wavelength of the sound frequency.

The outlet openings of all sound channels can be situated in a shared flat plane or in a curved surface area. By arranging them in a curved surface, e.g. a concave surface, focused wave fronts, for example, may be generated.

Each sound channel can be made from a metal or a plastic. Alternatively, each sound channel comprises a metal or a plastic.

Each ultrasonic transducer can have a sound uncoupling layer between the decoupling layer and the transducer housing.

The control unit can be arranged entirely or partially in the housing. Alternatively, the control unit is mounted in or on the vehicle and connected to the 1D ultrasonic transducer unit via suitable communication interfaces.

The housing of the 1D ultrasonic transducer unit can be designed according to at least the IP 40 protection class.

The housing can have at least one signal interface for transmitting a measuring signal and/or a control signal. The signal outlet is designed, for example, as a communication interface for communicating with the vehicle with the aid of one of the common bus systems or protocols.

Each ultrasonic transducer, including the sound decoupling layer, projects forward into the assigned inlet opening, in one refinement each sound channel accommodating at least one part of the assigned ultrasonic transducer, forming an accurate fit. In other words, an inner shape of the sound channels corresponds preferably precisely to an outer shape of the particular ultrasonic transducer in the area of the inlet opening according to this specific embodiment.

The housing of each ultrasonic transducer can have a diameter of at least 7 mm. The housing of each ultrasonic transducer is designed, for example, as a cylindrical metal cup. According to one refinement of this specific embodiment, a surface of the sound decoupling layer, an edge of the metal cup and, for example, a sound uncoupling layer of each individual ultrasonic transducer arranged therebetween each span a flat plane.

Each ultrasonic transducer can have an electromagnetic shielding at a reference potential. It is understood that the electromagnetic shielding may also be formed entirely or at least partially by the housing, in particular a metal cup being used as the housing. Alternatively, the 1D ultrasonic transducer unit may also have a shared shielding for all ultrasonic transducers, e.g. a shared housing.

Each sound channel can have a wall thickness of at least 0.5 mm or at least 1 mm. According to another refinement, each of two sound channels has a spacing of at least 0.5 mm or at least 1 mm over the entire length of the two sound channels.

The housing can comprise a planar rear wall and a front wall running in parallel to the rear wall. This makes it possible to particularly easily and reliably mount and align the 1D ultrasonic transducer unit on the vehicle. The ultrasonic transducers are preferably mounted on the rear wall, and the sound channels preferably end at or in the front wall. Not only the outlet openings of the sound channels but also the ultrasonic transducers as well as the inlet openings of the sound channels are particularly preferably arranged along a straight line. The straight line spanned by the inputs of the sound channels is, for example, significantly longer than the straight line spanned by the outlet openings.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
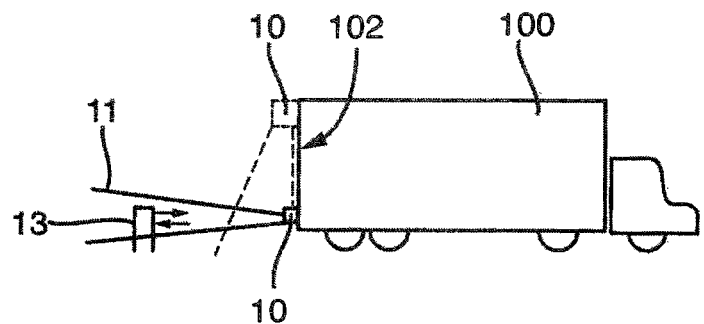
FIG. 1A shows a side view of a first specific embodiment according to the invention of a 1D ultrasonic transducer unit.

The illustration in FIG. 1A shows a view of a first specific embodiment of a 1D ultrasonic transducer unit 10 according to the invention on a vehicle 100. In the illustration in FIG. 1B, vehicle 100, including 1D ultrasonic transducer unit 10, is shown in a top view. 1D ultrasonic transducer unit 10 is mounted on a rear side 102 of vehicle 100 in the middle and in a lower area, so that sound waves 11 generated by 1D ultrasonic transducer unit 10 propagate away from rear side 102 of the vehicle and are reflected by objects 13 situated in the propagation area, in particular in the area of the so-called sound cone.

According to an alternative specific embodiment, two 1D ultrasonic transducer units 10 are mounted in the upper corners of rear side 102 of vehicle 100 (illustrated by the dashed line) and are oriented in such a way that the sound waves propagate essentially downwardly along the rear side and/or at a small angle with respect to the rear side.

Figure 1B:
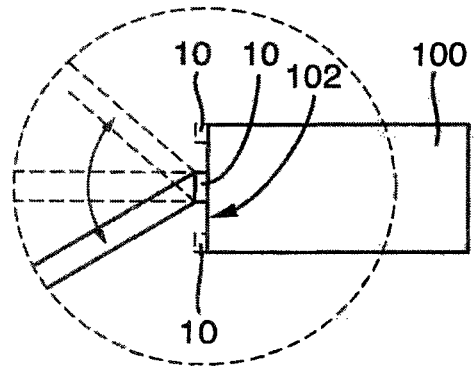
FIG. 1B shows a top view of the first specific embodiment according to the invention of the 1D ultrasonic transducer unit.

The top view in FIG. 1B further shows how sound waves 11 of 1D ultrasonic transducer unit 10 are pivotable or a main propagation direction of the generated sound waves may be set.

Figure 2:
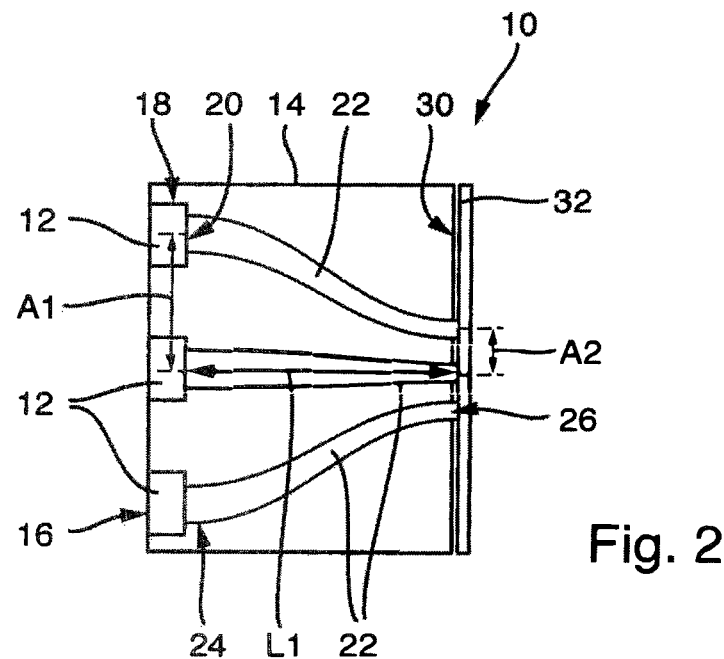
FIG. 2 shows a sectional view of a specific embodiment according to the invention of a housing of a 1D ultrasonic transducer unit.

The illustration in FIG. 2 shows a sectional view of a housing 14 of an ultrasonic transducer unit 10. Three discrete ultrasonic transducers 12 are arranged in housing 14 along a planar rear wall 16 of housing 14. Each ultrasonic transducer 12 has its own transducer housing 18 and a sound decoupling layer 20. Each ultrasonic transducer 12 is spaced a distance A1 apart from the directly adjacent ultrasonic transducer(s) 12 from the middle of sound decoupling layer 20 to the middle of sound decoupling layer 20.

A sound channel 22 is assigned to each ultrasonic transducer 12, each sound channel 22 having an inlet opening 24 and an outlet opening 26. Inlet openings 24 are each arranged in front of or around one of ultrasonic transducers 12 in such a way that particular ultrasonic transducer 12 radiates into sound channel 22. Outlet openings 26 of sound channels 22 are arranged along a planar front wall 30 of housing 14 opposite the rear wall, or they penetrate front wall 30.

Two adjacent outlet openings 26 in each case have a distance A2 from the middle of outlet opening 26 to the middle of outlet opening 26. According to the invention, distance A2 of outlet openings 26 is smaller or equal in each case to distance A1 of assigned or associated ultrasonic transducers 12.

A length L1 from each sound decoupling layer 20 to outlet opening 26 of associated sound channel 22 is an integral multiple of one-eighth of the wavelength of the sound frequency.

Housing 14 also comprises a movable cover device 32. Cover device 32 is in a closed state in the illustrated exemplary embodiment. For this purpose, the cover device is arranged in front of front wall 30 of housing 14 having outlet openings 26, so that sound channels 22 are closed. In an opened state, for example by a lifting or sliding action, cover device 32 is no longer in front of front housing wall 30, and outlet openings 26 and outlet openings 26 are exposed.

Figure 3:
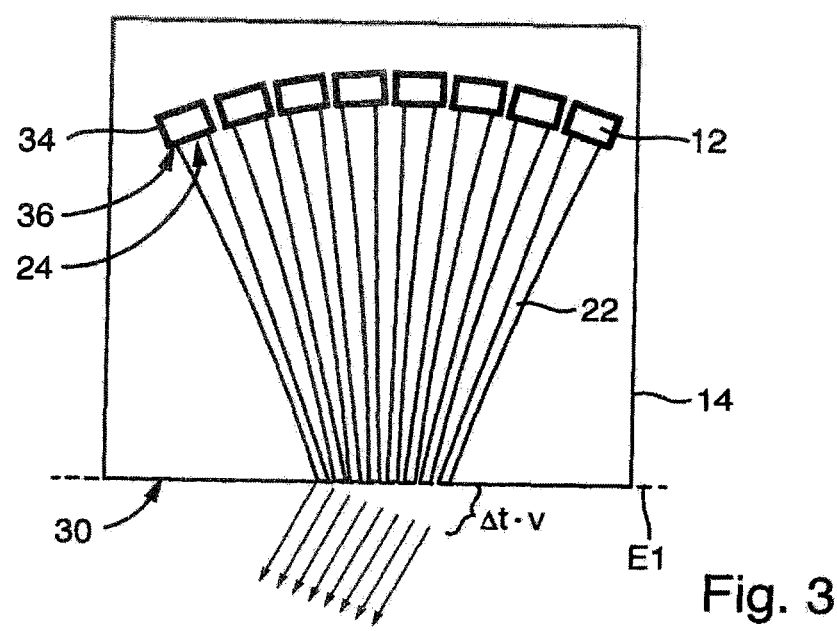
FIG. 3 shows a view of a further specific embodiment according to the invention of the sound channels.

In the exemplary embodiment illustrated in FIG. 3, sound channels 22 run in such a way that outlet openings 26 of all sound channels 22 are in a shared flat plane E1. In the illustrated exemplary embodiment, front wall 30 of housing 14 of 1D ultrasonic transducer unit 10 runs within plane E1. An area 34 of particular sound channel 22 still situated in front of inlet opening 24 of each sound channel 22 is designed in such a way that assigned ultrasonic transducer 12 in each case forms a precise fit within sound channel 22. For this purpose, each sound channel 22 has an inner diameter corresponding to outer diameter D1 in the area and an edge 36 serving as a stop.

A control unit, which is not illustrated, is designed to control each ultrasonic transducer 12 individually. Due to the time-shifted or phased control of individual ultrasonic transducers 12, 1D ultrasonic transducer unit 10 generates even ultrasonic waves having a main propagation direction (arrows), the main propagation direction or an angle between the main propagation direction and first plane E1 being settable with the aid of the phase shift between sound waves emerging from outlet openings 26 of the individual sound channels.

Figure 4:
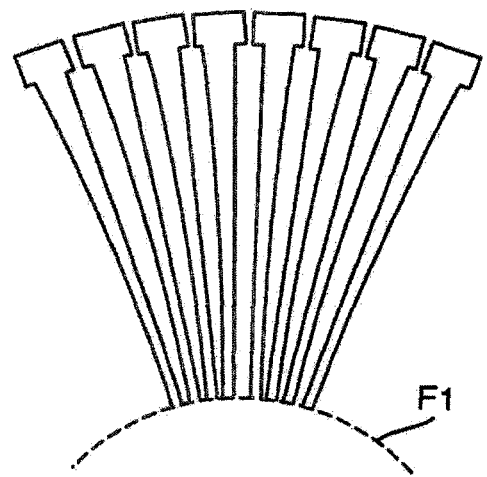
FIG. 4 shows a view of a further specific embodiment according to the invention of the sound channels.

In the exemplary embodiment illustrated in FIG. 4, outlet openings 40 of all sound channels 22 are situated in a concavely curved surface F1.

Figure 5:
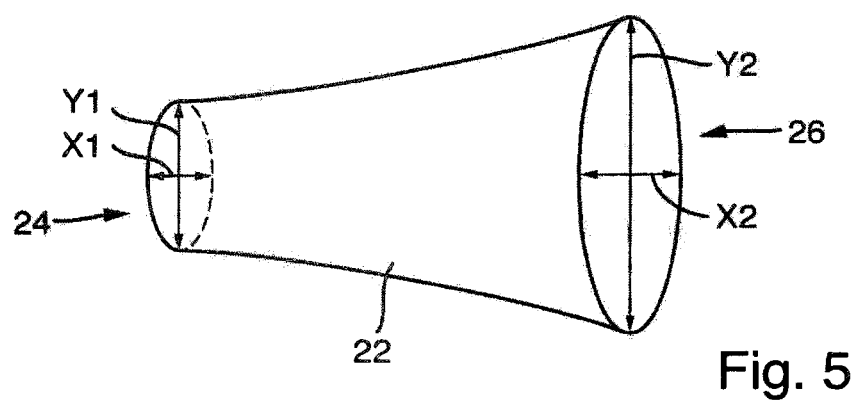
FIG. 5 shows a view of a further specific embodiment according to the invention of an individual sound channel.

An individual sound channel 22 is schematically shown in the illustration in FIG. 5, the differences with respect to FIGS. 1 through 4 being explained below.

Inlet opening 24 has a cross-sectional surface with a width x1 and a height y1; outlet opening 26 has a cross-sectional surface with a width x2 and a height y2.

Inlet opening 24 is provided with a circular design, i.e. width x1 and height y1 of the cross-sectional surface have the same value. Outlet opening 26, on the other hand, has an oval shape, so that width x2 of the cross-sectional surface is smaller than width y2.

In this case, width x2 of outlet opening 26 is smaller than width x1 of inlet opening 26. Height y2 of outlet opening 26, however, is preferably larger than height y1 of inlet opening 24. The height increase of sound channel 22 particularly preferably equals the decrease in the width of sound channel 22, in such a way that the surface area of the cross-sectional surface of inlet opening 24 corresponds to the surface area of the cross-sectional surface of outlet opening 26.

It is understood that width x2 of each outlet opening 26 must be smaller than the wavelength of the sound wave to be able to implement a distance from the middle of outlet opening 26 to the middle of a directly adjacent outlet opening 26 of no more than the wavelength of the sound frequency.

Figure 6:
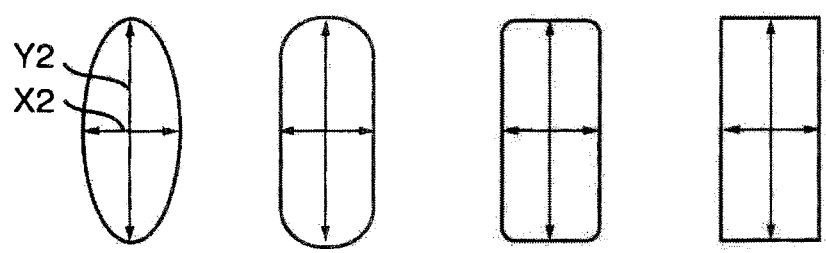
FIG. 6 shows a schematic view of different specific embodiments of an outlet surface of an sound channel.

Multiple exemplary embodiments according to the invention of the cross-sectional surfaces of outlet openings 26 are shown schematically in the illustration in FIG. 6. In particular, shapes which have a ratio of width x2 to height y2 of approximately 1.5 are suitable so that the surface area of the cross-sectional surface of outlet opening 26 corresponds to the surface area of the cross-sectional surface of inlet opening 24.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A 1D ultrasonic transducer unit for detecting danger for a vehicle, the transducer unit comprising:
   a housing;
   at least three ultrasonic transducers; and
   a control unit designed to control each ultrasonic transducer individually,
   wherein each ultrasonic transducer has a transducer housing, a piezoelectric body arranged in the transducer housing and a sound decoupling layer arranged on an open end of the transducer housing for decoupling into a gaseous medium and being arranged in a fixed position in the housing,
   wherein each ultrasonic transducer is designed to emit and/or to receive a sound wave at a working frequency,
   wherein the working frequency of the sound waves being in a range from 20 kHz to 400 kHz,
   wherein two ultrasonic transducers directly adjacent to each other in each case in the housing have a distance of no more than 10 cm from a middle of the sound decoupling layer of one of the two ultrasonic transducers to a middle of the sound decoupling layer of other one of the two ultrasonic transducers,
   wherein the 1D ultrasonic transducer unit has one sound channel for each ultrasonic transducer,
   wherein each sound channel has one inlet opening and one outlet opening,
   wherein each sound decoupling layer is assigned to exactly one of the inlet openings,
   wherein the outlet openings each are arranged in a wall of the housing not abutting the vehicle or the sound channels penetrating the wall of the housing,
   wherein a distance from a middle of one outlet opening to a middle of a directly adjacent outlet opening corresponds to no more than a predetermined wavelength based on the working frequency in the gaseous medium or no more than half the predetermined wavelength,
   wherein the distance between two directly adjacent outlet openings each being smaller than the distance of the ultrasonic transducers assigned to the corresponding inlet openings,
   wherein a ratio of a surface area of the outlet opening to a surface area of the corresponding inlet opening having a value between 0.9 and 1.1,
   wherein the outlet openings of the sound channels are arranged along a first direction,
   wherein each of the outlet openings has an outlet width along the first direction and an outlet height along a second direction perpendicular to the first direction,
   wherein a ratio of the outlet height to the outlet width is 1.5,
   wherein the housing is mounted on the vehicle,
   wherein the housing includes a movable cover device configured to close the outlet openings of all sound channels when the 1D ultrasonic transducer unit is not in use, and
   wherein the outlet openings of all sound channels are situated in a curved surface or in a shared flat plane.

2. The 1D ultrasonic transducer unit according to claim 1, wherein each sound channel has a length from the sound decoupling layer of each ultrasonic transducer to the outlet opening of the assigned sound channel, and the length is an integral multiple of one eighth of the predetermined wavelength or an integral multiple of half the predetermined wavelength.

3. The 1D ultrasonic transducer unit according to claim 1, wherein each sound channel is made from a metal or a plastic or comprises a metal or a plastic.

4. The 1D ultrasonic transducer unit according to claim 1, wherein each ultrasonic transducer has a sound uncoupling layer between the decoupling layer and the transducer housing.

5. The 1D ultrasonic transducer unit according to claim 1, wherein the control unit is arranged entirely or partially in the housing.

6. The 1D ultrasonic transducer unit according to claim 1, wherein the housing of the 1D ultrasonic transducer unit is designed according to at least an IP 40 protection class.

7. The 1D ultrasonic transducer unit according to claim 1, wherein the housing has at least one signal interface for transmitting a measuring signal and/or a control signal.

8. The 1D ultrasonic transducer unit according to claim 1,
wherein the ultrasonic transducers of the 1D ultrasonic transducer unit are individual, discrete components arranged in the housing and connected to the housing, and
wherein two ultrasonic transducers of the 1D ultrasonic transducer unit are arranged side by side, between which no further ultrasonic transducer is arranged.

9. The 1D ultrasonic transducer unit according to claim 1, wherein multiple of the ultrasonic transducers of the 1D ultrasonic transducer unit are individually controllable to generate wave fronts having an adjustable main propagation direction based on time-shifted or phase-shifted control.

10. The 1D ultrasonic transducer unit according to claim 1, wherein the cover device is configured to close the outlet openings as standard and to be removed once the vehicle is reversing or a reverse gear is engaged.

11. The 1D ultrasonic transducer unit according to claim 1, wherein an inner shape of the sound channels corresponds to an outer shape of the corresponding ultrasonic transducers in areas of the inlet openings.

12. The 1D ultrasonic transducer unit according to claim 1,
wherein the transducer housing of each ultrasonic transducer forms a cylindrical metal cup, and
wherein a surface of the sound decoupling layer, an edge of the metal cup, and a sound uncoupling layer of each individual ultrasonic transducer arranged therebetween each span a flat plane.

13. The 1D ultrasonic transducer unit according to claim 1,
wherein each ultrasonic transducer has an electromagnetic shielding, and
wherein the electromagnetic shielding is formed entirely or at least partially by the corresponding transducer housing, or formed as a shared housing for all ultrasonic transducers.

14. The 1D ultrasonic transducer unit according to claim 1, wherein
the housing comprises a planar rear wall and a front wall running in parallel to the rear wall to facilitate mounting and alignment of the 1D ultrasonic transducer unit on the vehicle,
the ultrasonic transducers are mounted on the rear wall,
the sound channels end at or in the front wall, and
the outlet openings of the sound channels and the inlet openings of the sound channels are arranged along respective straight lines, a straight line spanned by the inlet openings is longer than a straight line spanned by the outlet openings.

15. The 1D ultrasonic transducer unit according to claim 1, wherein
each of the inlet openings has an inlet width along the first direction and an inlet height along the second direction,
the outlet width is smaller than the inlet width, and
the outlet height is greater than the inlet height.

16. The 1D ultrasonic transducer unit according to claim 1, wherein the surface area of the outlet opening and the surface area of the corresponding inlet opening remains the same.

* * * * *